(12) United States Patent
Williams

(10) Patent No.: US 7,524,111 B1
(45) Date of Patent: Apr. 28, 2009

(54) RIGID-BOTTOMED RESEALABLE BAG WITH HANDLES

(76) Inventor: Sudie M. Williams, 17521 NW. 37th Ct., Opa-Locka, FL (US) 33599

( * ) Notice: Subject to any disclaimer, the term of this patent is extended or adjusted under 35 U.S.C. 154(b) by 673 days.

(21) Appl. No.: 11/187,256

(22) Filed: Jul. 25, 2005

(51) Int. Cl.
B65D 30/16 (2006.01)
B65D 33/06 (2006.01)
B65D 33/16 (2006.01)
B65D 33/10 (2006.01)

(52) U.S. Cl. .............. 383/104; 383/6; 383/63; 383/121; 383/121.1; 220/23.87; 220/23.91

(58) Field of Classification Search ............... 383/61.2, 383/63, 104, 121.1, 121, 95, 61.1, 119, 2, 383/42, 64, 906, 907, 6; 220/23.9, 23.91, 220/625, 626, 628, 630, 636, 651, 654, 729, 220/23.86, 495.01, 495.02, 495.03, 220/495.06; 190/127; 150/130, 129, 127; 206/514; 248/95, 97, 98, 907
See application file for complete search history.

(56) References Cited

U.S. PATENT DOCUMENTS

| | | | | |
|---|---|---|---|---|
| 2,021,787 A | * | 11/1935 | Janowitz ..................... 16/407 |
| 3,172,444 A | * | 3/1965 | Frommelt et al. ............. 383/95 |
| 3,292,813 A | * | 12/1966 | Roegner ................ 220/495.11 |
| 4,300,312 A | * | 11/1981 | Weder et al. .................... 47/72 |
| 4,842,228 A | * | 6/1989 | Kasper ........................ 220/908 |
| 5,014,872 A | * | 5/1991 | Robbins, III ............. 383/121.1 |
| 5,108,195 A | * | 4/1992 | Perron .......................... 383/63 |
| 5,934,806 A | * | 8/1999 | Tomic et al. ................... 383/63 |
| 6,558,037 B2 | | 5/2003 | Gonella |
| 2003/0053723 A1 | * | 3/2003 | Lanham et al. ............. 383/104 |
| 2004/0032995 A1 | * | 2/2004 | Galomb ....................... 383/63 |
| 2004/0066987 A1 | * | 4/2004 | O'Neill ...................... 383/104 |

* cited by examiner

Primary Examiner—Nathan J Newhouse
Assistant Examiner—Matt Benvenuti

(57) ABSTRACT

A partially flexible recloseable bag including a flexible cylindrical body, a rigid cylindrical base with a bottom at the bottom of the body, a pair of opposed trapezoidal panels within the top of the body, each panel having a seamless interface with the body, a reusable seal across the opening between the top of the panels, loop handles with extended bonds on each panel proximal to the seal.

4 Claims, 5 Drawing Sheets

RIGID-BOTTOMED RESEALABLE BAG WITH HANDLES

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Disposable bags, especially garbage bags and the like are historically known to confront several problems. These problems include (1) lack of support for stand-alone function, (2) lack of support when full of heavier items, (3) lack of strength for containing heavier items, (4) lack of resealable closure, (5) lack of handles for carrying the bag, and (6) the need for inserting a bag within a bag container. While various attempts to address some of these problems may have been attempted, the present invention successfully addresses all of the above issues.

FIELD OF THE INVENTION

This invention relates to resealable bags and more specifically to rigid-bottomed resealable bag with handles.

SUMMARY OF THE INVENTION

The general purpose of the rigid-bottomed resealable bag with handles, described subsequently in greater detail, is to provide a rigid-bottomed resealable bag with handles which has many novel features that result in an improved rigid-bottomed resealable bag with handles which is not anticipated, rendered obvious, suggested, or even implied by prior art, either alone or in combination thereof.

The invention comprises a partially flexible resealable bag with a cylindrical body. The body has a top and a body bottom. A rigid cylindrical base with a base bottom forms the bottom of the body. The body bottom and the rigid cylindrical base and base bottom are integral. The base and base bottom are of a slightly smaller diameter than the body and the rigid case and case bottom. The base and base bottom therefore removably fit within the rigid case. The rigid case provides for even greater support in holding the bag. The rigid case is also provided in a variety of colors and designs for more attractive appearance.

A pair of opposed trapezoidal panels are within the top of the body. The longest side of the trapezoid panel is at the top of the body. Each panel has a seamless interface with the body. Each panel has a height. A flexible, recloseable seal is disposed across the entire opening of the top of the opposed top panels. It is typical in the art to refer to seals as reusable, recloseable, or resealable. The invention's seal is recloseable and therefore reusable on the same bag. The invention's seal is also resealable, as the design of the seal provides for sealing the contents of the bag.

The sealable feature prevents odors and liquids and the like from escaping. Separation of the seal creates the opening of the invention. Each trapezoidal panel comprises an integrated handle proximal to the recloseable seal. Each handle is comprised of a flexible loop with two spaced apart ends. Each end of each handle is bonded to the panel. Each bonded handle end further comprises an extended bond. Each extended bond extends about ⅝ of the height of the panel. The extended bond therefore accommodates any size example of the invention. The extended bonds prevent handle and panel failures due to heavy articles contained within the invention. Bonds shorter than those expressly utilized by the invention invite failure and are typically known in the art. A small example of the invention has smaller extended bonds, as a smaller bag is typically exposed to less weight within. A larger example of the invention, due to the ratio of the extended bonds to the panel height, has longer extended bonds.

The flexible resealable seal is disposed across the entirety of the top of the panels. The flexible seal is flexed apart to open the panels apart from each other. The female half of the seal is affixed atop one panel. The male half of the seal is affixed atop the opposing panel. The face of the female half contacts the face of the male half. The male half comprises a shaft extending laterally from the male half. The shaft is perpendicular to the face of the male half. A pair of opposed spaced apart nodes are disposed at the end of the shaft. The nodes are perpendicular to the length of the shaft. The female half comprises a channel disposed in the approximate center of the female half. The channel is perpendicular to the face. Opposing space apart indents are disposed at the end of the channel.

The channel removably receives the shaft. The pair of spaced apart indents removably receives the nodes. The flexibility of the seal provides for easily sealing and resealing the seal.

An alternate example of the invention features the body bonded to a top of the rigid base. The rigid base and base bottom are removably inserted within the rigid case and case bottom. The invention is not limited in size in the various offerings of the invention. The invention solves the problems facing usage of bags in a variety of circumstances. The invention negates the need for a separate trash bag and trash can, as example, combining the two into one disposable unit. The invention is offered in kits which are separate from the rigid case. The invention is also offered in kits which include a number of the bags, accompanied by one rigid base, as example, so that the rigid base is used repeatedly and the bags thrown out as needed.

Thus has been broadly outlined the more important features of the rigid-bottomed resealable bag with handles so that the detailed description thereof that follows may be better understood and in order that the present contribution to the art may be better appreciated.

Numerous objects, features and advantages of the rigid-bottomed resealable bag with handles will be readily apparent to those of ordinary skill in the art upon reading the following detailed description of presently preferred, but nonetheless illustrative, examples of the rigid-bottomed resealable bag with handles when taken in conjunction with the accompanying drawings.

In this respect, before explaining the current examples of the rigid-bottomed resealable bag with handles in detail, it is to be understood that the invention is not limited in its application to the details of construction and arrangements of the components set forth in the following description or illustration. The invention is capable of other examples and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the rigid-bottomed resealable bag with handles. It is therefore important that the claims be regarded as including such equivalent constructions insofar as they do not depart from the spirit and scope of the present invention.

Objects of the rigid-bottomed resealable bag with handles, along with various novel features that characterize the invention are particularly pointed out in the claims forming a part of this disclosure. For better understanding of the rigid-bottomed resealable bag with handles, its operating advantages and specific objects attained by its uses, refer to the accompanying drawings and description.

DETAILED DESCRIPTION OF THE DRAWINGS

With reference now to the drawings, and in particular FIGS. 1 through 6 thereof, example of the rigid-bottomed resealable bag with handles employing the principles and concepts of the present invention and generally designated by the reference number 10 will be described.

Figure 1:
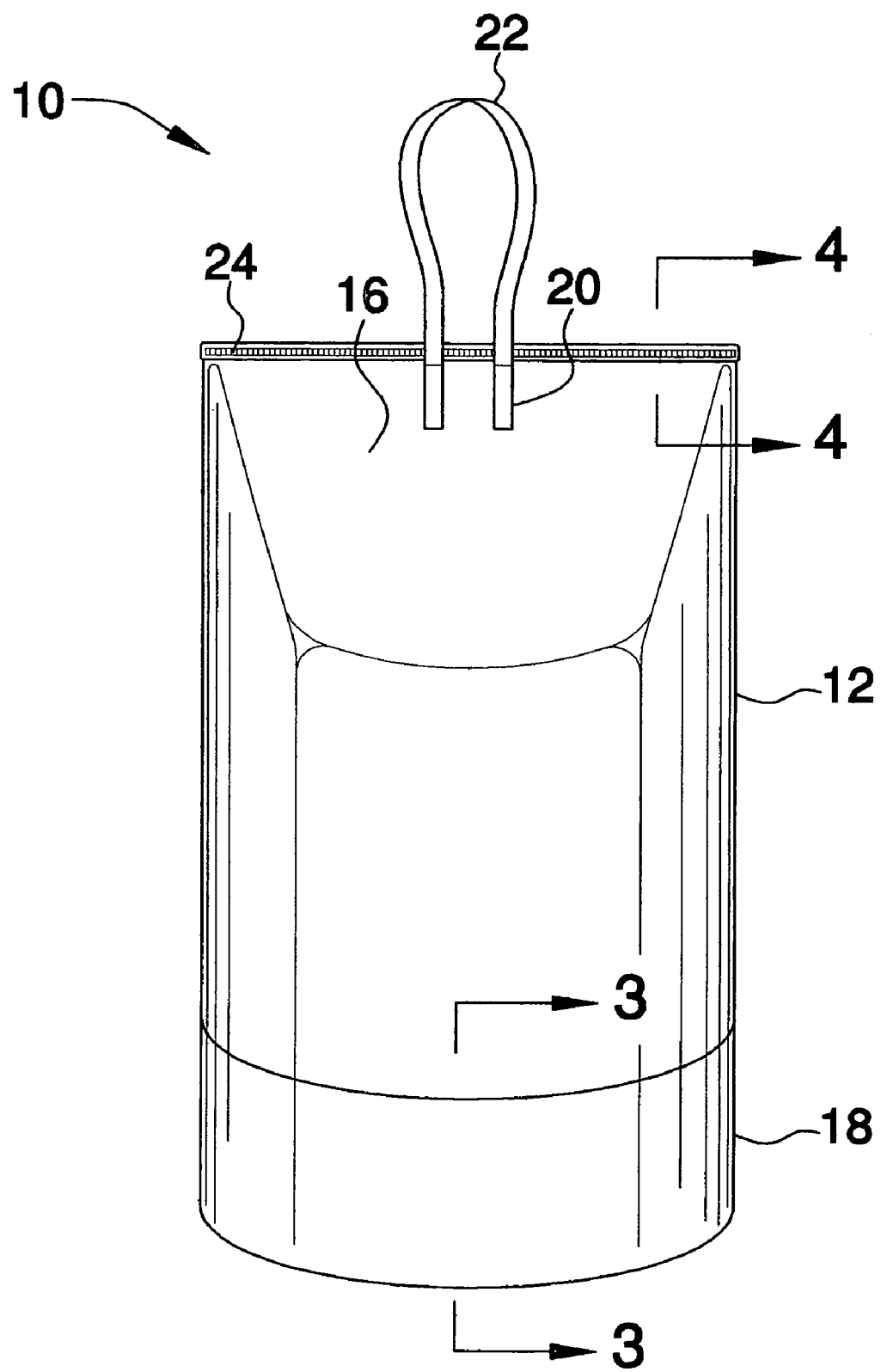
FIG. 1 is a front elevation view of the invention.
Figure 2:
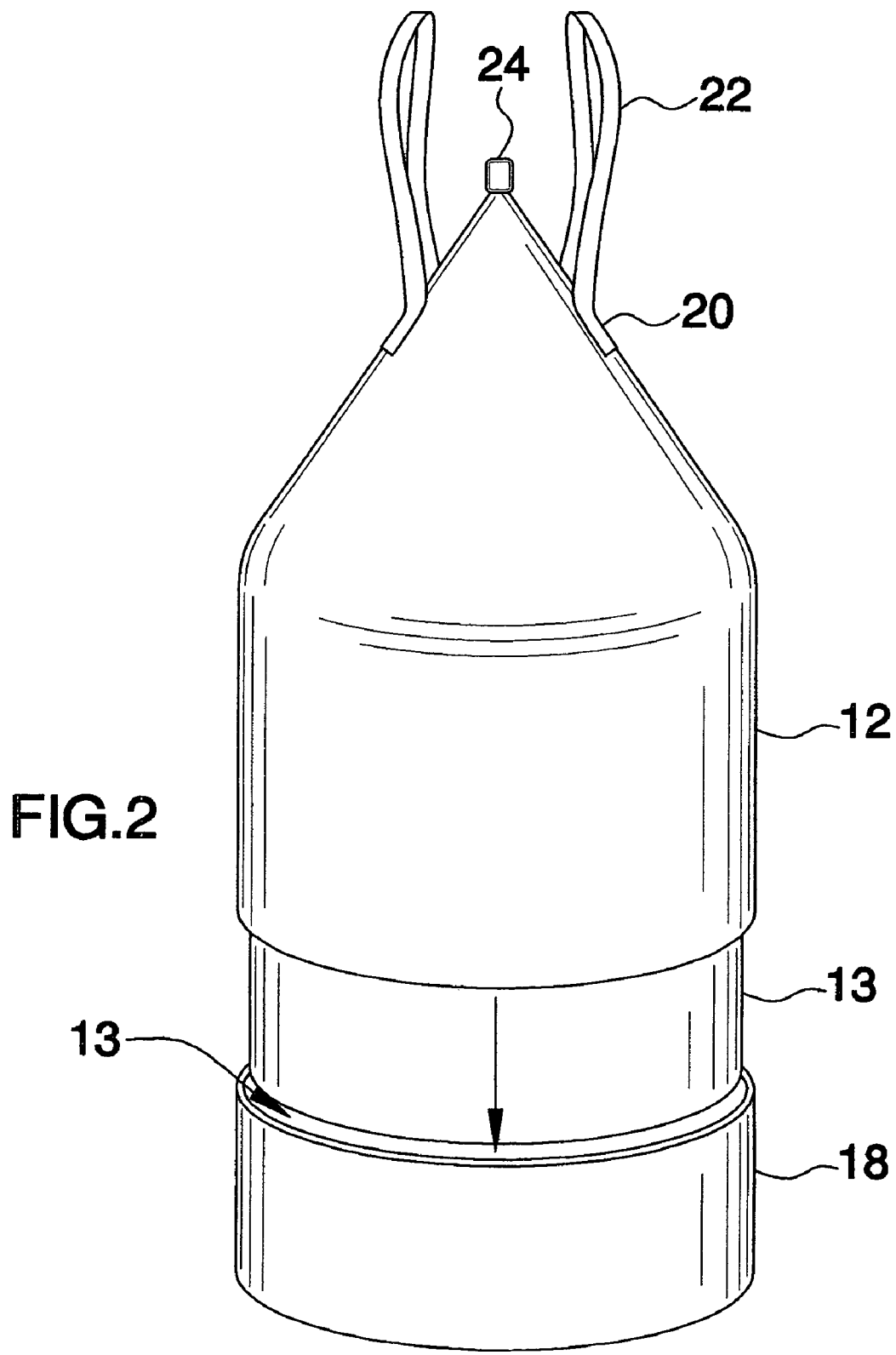
FIG. 2 is a lateral elevation view of the invention, the body bottom removed from the rigid case.

Referring to FIGS. 1 and 2, the invention 10 comprises a partially flexible resealable bag with a cylindrical body 12. The body 12 has a top and a body bottom 13. A rigid cylindrical base 14 with a base bottom 15 forms the bottom of the body 12. The base 14 and base bottom 15 are of a slightly smaller diameter than the body 12 and the rigid case 18 and case bottom 19. The base 14 and base bottom 15 therefore removably fit within the rigid case 18. A pair of opposed trapezoidal panels 16 are within the top of the body 12. The longest side of the trapezoid panel 16 is at the top of the body 12. Each panel 16 has a seamless interface with the body 12. Each panel 16 has a height. A flexible, recloseable seal 24 is disposed across the entire opening of the top of the opposed top panels 16. Separation of the seal 24 creates the opening (not shown) of the invention 10. Each trapezoidal panel 16 further comprises an integrated handle 22 proximal to the recloseable seal 24. Each handle 22 is comprised of a flexible loop with two spaced apart ends. Each end of each handle 22 is bonded to the panel 16. Each bonded handle 22 end further comprises an extended bond 20. Each extended bond 20 extends about ¼ of the height of the panel 16. The extended bond 20 therefore accommodates any size example of the invention 10. The extended bonds 20 prevent handle 22 and panel 16 failures due to heavy articles (not shown) contained within the invention 10. A small example of the invention 10 has smaller extended bonds 20. A larger example of the invention 10, due to the ratio of the extended bonds 20 to the panel 16 height, has longer extended bonds 20.

Figure 3:
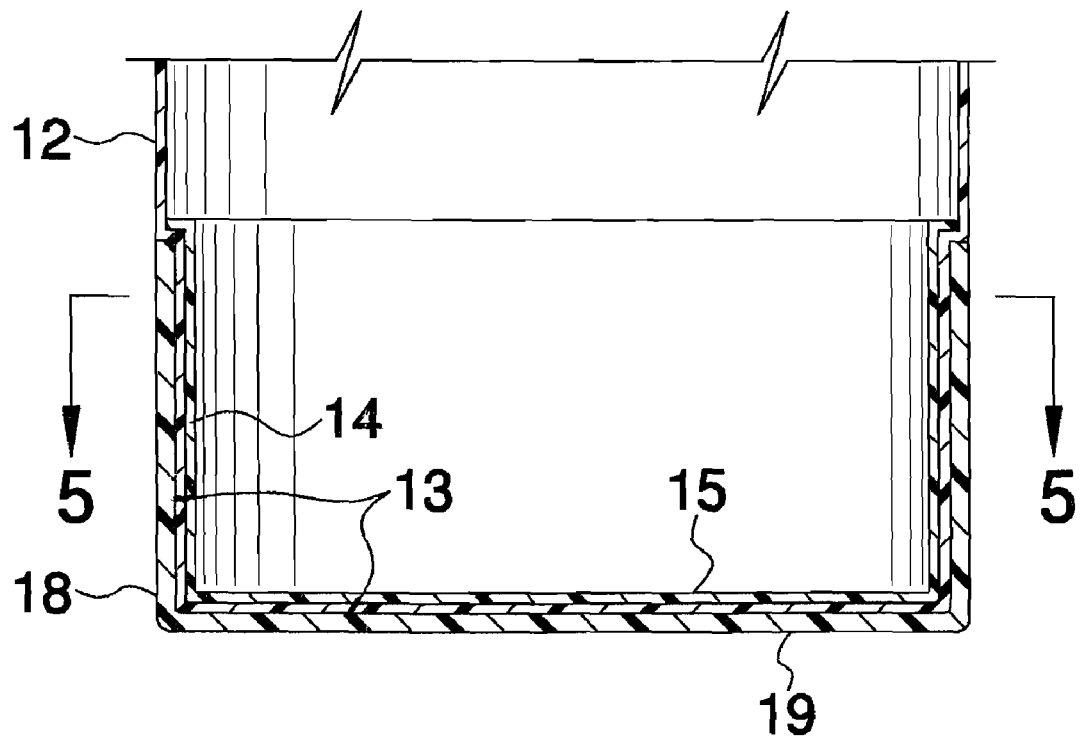
FIG. 3 is cross sectional view of the lower portion of the invention in FIG. 1, taken along the line 3-3.

Referring to FIG. 3, the rigid base (14) and base bottom (15) is inserted within the body bottom (13) of the body (12). The body bottom 13 and the rigid base 14 and rigid base bottom 15 are integrated. The bottom portion of the body 12 is therefore rigid. The body bottom 13 and rigid base 14 and base bottom 15 are removably inserted within the optional rigid case 18 and case bottom 19.

Figure 4:
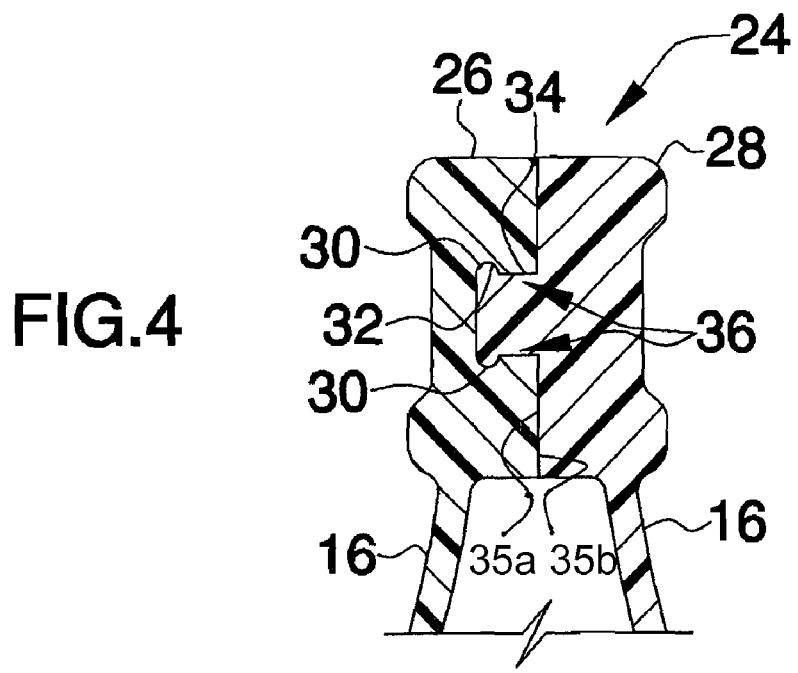
FIG. 4 is a lateral cross sectional view of the seal of the invention, the view taken along the line 4-4 of FIG. 1.

Referring to FIG. 4, the flexible resealable seal 24 is disposed across the entirety of the top of the panels 16. The flexible seal 24 is flexed apart (not shown) to open the panels 16 apart from each other. The female half 26 of the seal 24 is affixed atop one panel 16. The male half 28 of the seal 24 is affixed atop the opposing panel 16. The face 35$a$ of the female half 26 contacts the face 35$b$ of the male half 28. The male half 28 comprises a shaft 34 extending laterally from the male half 28. The shaft 34 is perpendicular to the face 35$b$ of the male half 28. A pair of opposed spaced apart nodes 30 are disposed at the end of the shaft 34. The nodes 30 are perpendicular to a length of the shaft 34. The female half 26 comprises a channel 36 disposed in the approximate center of the female half 26. The channel 36 is perpendicular to the face 35$a$. Opposing spaced apart indents 32 are disposed at the end of the channel 36. The channel 36 removably receives the shaft 34. The pair of spaced apart indents 32 removably receives the nodes 30. The flexibility of the seal 24 provides for easily sealing and resealing the seal 24.

Figure 5:
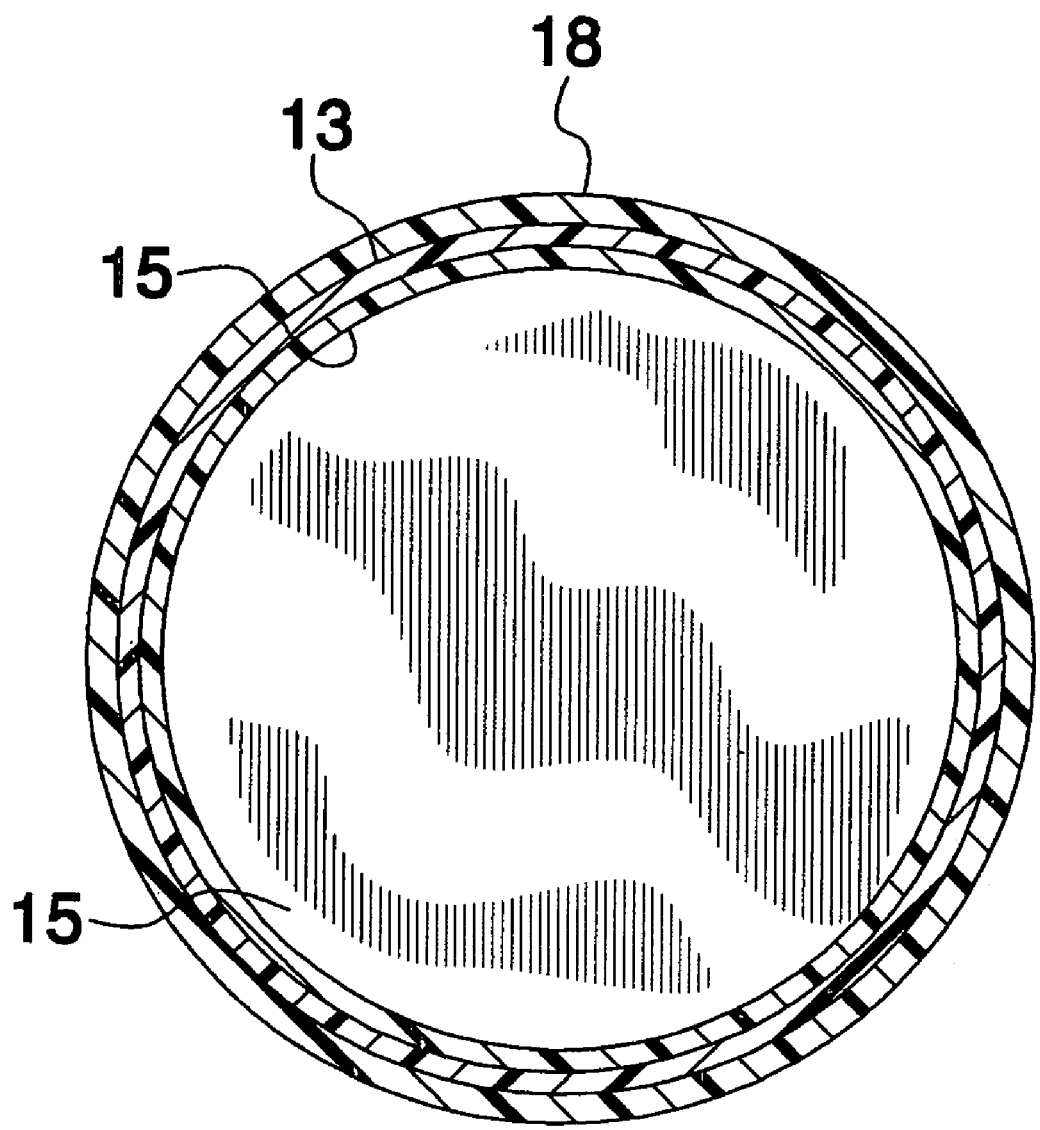
FIG. 5 is a top cross sectional view of the invention in FIG. 3 taken along the line 5-5.

Referring to FIG. 5, the base bottom 15 is integral with the body bottom 13. The base bottom 15 and the body bottom 13 are removably inserted within the rigid case 18. The rigid case 18 provides for added rigidity when needed. The rigid case 18 also provides for colored decoration (not shown).

Figure 6:
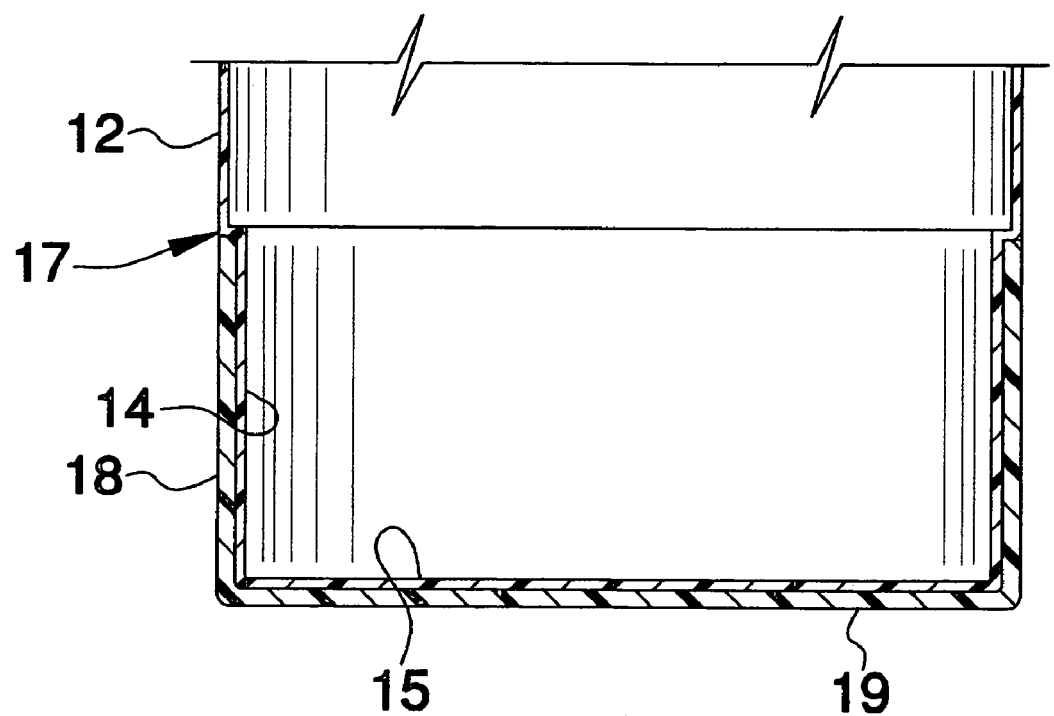
FIG. 6 is an alternate example of the invention, the body of the bag bonded to the rigid base.

Referring to FIG. 6, the alternate example of the invention 10 features the body 12 bonded to a top of the rigid base 14. The bond 17 affixes the body 12 to the rigid base 14. The rigid base 14 base bottom 15 are removably inserted within the rigid case 18 and case bottom 19.

With respect to the above description then, it is to be realized that the optimum dimensional relationships for the parts of the rigid-bottomed resealable bag with handles, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Directional terms such as "front", "back", "in", "out", "downward", "upper", "lower", and the like may have been used in the description. These terms are applicable to the examples shown and described in conjunction with the drawings. These terms are merely used for the purpose of description in connection with the drawings and do not necessarily apply to the position in which the present invention may be used.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A partially flexible recloseable bag, comprising:
   a flexible cylindrical body having a top and a bottom;
   a rigid cylindrical base with a base bottom;

a pair of opposed trapezoidal panels within the top of the body, each panel having a seamless interface with the body, each panel having a height;
an opening between a top of the panels;
a flexible reusable seal disposed across the entire opening of the top of the opposed top panels, the seal comprising:
  a male half on one panel;
  a female half on the opposing panel;
  wherein the male half removably inserts within the female half;
  wherein the male half of the seal further comprises:
    a shaft extending laterally from the male half;
    a pair of opposed spaced apart nodes at the end of the shaft, the nodes perpendicular to a length of the shaft;
  wherein the female half of the seal comprises:
    a channel, the channel for removably receiving the shaft of the male half of the seal;
    a pair of spaced apart indents at an end of the channel, the spaced apart indents for removably receiving the nodes of the male half of the seal;
a reusable cylindrical rigid case having a case bottom, the case removably receiving the base, the body removably sandwiched between the rigid case and the base.

2. The bag in claim 1 wherein each trapezoidal panel further comprises an integrated handle proximal to the reusable seal.

3. The bag in claim 2 wherein each handle is a flexible loop handle with two spaced apart ends, each end bonded to the panel.

4. The bag in claim 3 wherein each bonded handle end further comprises an extended bond, each bond extending about ¼ of the height of the panel.

* * * * *